United States Patent
Kwon et al.

(10) Patent No.: US 9,236,629 B2
(45) Date of Patent: *Jan. 12, 2016

(54) CABLE-TYPE SECONDARY BATTERY

(75) Inventors: Yo-Han Kwon, Daejeon (KR); Je-Young Kim, Daejeon (KR); Byung-Hun Oh, Daejeon (KR); Ki-Tae Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/291,407

(22) Filed: Nov. 8, 2011

(65) Prior Publication Data

US 2012/0058376 A1 Mar. 8, 2012

Related U.S. Application Data

(63) Continuation of application No. PCT/KR2011/000580, filed on Jan. 27, 2011.

(30) Foreign Application Priority Data

Feb. 1, 2010 (KR) ........................ 10-2010-0009049

(51) Int. Cl.
*H01M 10/04* (2006.01)
*H01M 2/02* (2006.01)
(Continued)

(52) U.S. Cl.
CPC ........ *H01M 10/0413* (2013.01); *H01M 2/0237* (2013.01); *H01M 2/0267* (2013.01); *H01M 4/13* (2013.01); *H01M 4/131* (2013.01); *H01M 4/133* (2013.01); *H01M 4/134* (2013.01); *H01M 4/525* (2013.01); *H01M 4/66* (2013.01);
(Continued)

(58) Field of Classification Search
CPC ............ H01M 4/0473; H01M 10/058; H01M 10/0585; H01M 10/03972; H01M 10/5028; H01M 2004/022; H01M 2004/024; H01M 2004/025
See application file for complete search history.

(56) References Cited

U.S. PATENT DOCUMENTS 4,522,897 A * 6/1985 Walsh ........................... 429/119
7,618,748 B2 * 11/2009 Nathan et al. ................. 429/238
(Continued)

FOREIGN PATENT DOCUMENTS

| JP | 04-169066 A | 6/1992 |
|---|---|---|
| JP | 08-088016 A | 4/1996 |

(Continued)

*Primary Examiner* — Ula C Ruddock
*Assistant Examiner* — Amanda Barrow
(74) *Attorney, Agent, or Firm* — Lerner, David, Littenberg, Krumholz & Mentlik, LLP

(57) ABSTRACT

The present invention relates to a cable-type secondary battery comprising an inner electrode comprising at least two anodes arranged in parallel, the anode extending longitudinally and having a horizontal cross section of a predetermined shape, the anode having an electrolyte layer thereon serving as an ion channel; an outer electrode comprising a cathode including a cathode active material layer surrounding the inner electrode; and a protection coating surrounding the outer electrode. The cable-type secondary battery has free shape adaptation due to its linearity and flexibility. A plurality of inner electrodes within a tubular outer electrode lead to an increased contact area therebetween and consequently a high battery rate. It is easy to control the capacity balance between the inner and outer electrodes by adjusting the number of inner electrodes. A short circuit is prevented due to the electrolyte layer formed on the inner electrode.

19 Claims, 1 Drawing Sheet

(51) Int. Cl.
  *H01M 4/13* (2010.01)
  *H01M 4/131* (2010.01)
  *H01M 4/133* (2010.01)
  *H01M 4/134* (2010.01)
  *H01M 4/525* (2010.01)
  *H01M 4/66* (2006.01)
  *H01M 6/44* (2006.01)
  *H01M 10/0525* (2010.01)
  *H01M 10/0565* (2010.01)
  *H01M 10/058* (2010.01)
  *H01M 4/75* (2006.01)
  *H01M 2/16* (2006.01)
  *H01M 4/70* (2006.01)
  *H01M 4/02* (2006.01)

(52) U.S. Cl.
  CPC ............ *H01M 4/661* (2013.01); *H01M 4/663* (2013.01); *H01M 4/667* (2013.01); *H01M 4/668* (2013.01); *H01M 4/75* (2013.01); *H01M 6/44* (2013.01); *H01M 10/0422* (2013.01); *H01M 10/058* (2013.01); *H01M 10/0525* (2013.01); *H01M 10/0565* (2013.01); *H01M 2/1673* (2013.01); *H01M 4/70* (2013.01); *H01M 2004/025* (2013.01); *Y02E 60/122* (2013.01); *Y02T 10/7011* (2013.01)

(56) References Cited

U.S. PATENT DOCUMENTS

| | | |
|---|---|---|
| 2001/0046623 A1 | 11/2001 | Akahira |
| 2003/0068559 A1 | 4/2003 | Armstrong et al. |
| 2004/0023119 A1 | 2/2004 | Mizutani et al. |
| 2004/0258982 A1* | 12/2004 | Coffey et al. .............. 429/94 |
| 2005/0147857 A1 | 7/2005 | Crumm et al. |
| 2005/0170253 A1* | 8/2005 | Yoon et al. .............. 429/307 |
| 2005/0175890 A1* | 8/2005 | Tsutsumi et al. .......... 429/101 |
| 2006/0099510 A1* | 5/2006 | Naarmann et al. ......... 429/232 |
| 2006/0115735 A1 | 6/2006 | Yasuda et al. |
| 2007/0134549 A1* | 6/2007 | Nathan et al. ............. 429/149 |
| 2007/0243456 A1 | 10/2007 | Ahn et al. |
| 2008/0131784 A1 | 6/2008 | Hwang et al. |
| 2008/0137890 A1 | 6/2008 | Petersen et al. |
| 2008/0241689 A1 | 10/2008 | Takami et al. |
| 2008/0268338 A1 | 10/2008 | Lee et al. |
| 2009/0107746 A1 | 4/2009 | Horie et al. |
| 2009/0146604 A1* | 6/2009 | Choi et al. ................ 320/101 |
| 2009/0214956 A1 | 8/2009 | Prieto et al. .............. 429/310 |
| 2010/0291431 A1* | 11/2010 | Shih et al. ................ 429/159 |
| 2011/0189510 A1* | 8/2011 | Caracciolo et al. ......... 429/50 |
| 2011/0274954 A1* | 11/2011 | Cho et al. .................. 429/94 |
| 2012/0100412 A1* | 4/2012 | Kwon et al. .............. 429/149 |
| 2012/0219844 A1* | 8/2012 | Tsutsumi et al. .......... 429/153 |

FOREIGN PATENT DOCUMENTS

| | | | | |
|---|---|---|---|---|
| JP | 08-088019 A | | 4/1996 | |
| JP | 09-007629 A | | 1/1997 | |
| JP | 2001-110445 | * | 4/2001 | ........... H01M 10/40 |
| JP | 2007087789 A | | 4/2007 | |
| JP | 2008243612 A | | 10/2008 | |
| JP | 2010129412 A | | 6/2010 | |
| KR | 20050030438 A | | 3/2005 | |
| KR | 20050099903 A | | 10/2005 | |
| KR | 20070009231 A | | 1/2007 | |
| KR | 20070043537 A | | 4/2007 | |
| KR | 10-0742739 B1 | | 7/2007 | |
| KR | 2007-0075928 | * | 7/2007 | ............. H01M 4/70 |
| KR | 20070075928 A | | 7/2007 | |
| KR | 10-0804411 B1 | | 2/2008 | |
| KR | 20080067371 A | | 7/2008 | |
| KR | 20090009598 A | | 1/2009 | |
| KR | 20100006985 A | | 1/2010 | |
| WO | WO 2005/098994 | * | 5/2004 | ............. H01M 2/10 |
| WO | WO 2005/101973 | * | 11/2005 | |
| WO | 2009014299 A1 | | 1/2009 | |
| WO | WO 2010/076975 | * | 11/2009 | ............. H01M 8/02 |
| WO | PCT/JP2010/004526 | * | 1/2011 | ............. H01M 4/75 |

\* cited by examiner

CABLE-TYPE SECONDARY BATTERY

CROSS-REFERENCE TO RELATED APPLICATION

This application is a continuation of International Application No. PCT/KR2011/000580 filed on Jan. 27, 2011, which claims priority under 35 U.S.C. 119(a) to Korean Patent Application No. 10-2010-0009049 filed in the Republic of Korea on Feb. 1, 2010, the entire contents of which are incorporated herein by reference.

TECHNICAL FIELD

The present invention relates to a cable-type secondary battery of free shape adaptation.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

The secondary batteries are currently used in applications requiring low electric power, for example, equipment to help the start-up of vehicles, portable devices, tools, uninterruptible power supplies, and the like. Recently, as the development of wireless communication technologies has been leading to the popularization of portable devices and even to the mobilization of many kinds of conventional devices, the demand for the secondary batteries is dramatically increasing. The secondary batteries are also used in environmentally friendly next-generation vehicles such as hybrid vehicles and electric vehicles to reduce the costs and weight and to increase the service life of the vehicles.

Generally, the secondary batteries have a cylindrical, prismatic, or pouch shape. This is associated with a manufacturing process of the secondary batteries in which an electrode assembly composed of an anode, a cathode, and a separator is mounted in a cylindrical or prismatic metal case or a pouch-shaped case of an aluminum laminate sheet, and in which the case is filled with electrolyte. Because a predetermined mounting space for the electrode assembly is necessary in this process, the cylindrical, prismatic or pouch shape of the secondary batteries is a limitation in developing various shapes of portable devices. Accordingly, there is a need for a secondary battery of a new structure that is easily adaptable in shape.

To fulfill this need, suggestions have been made to develop linear batteries having a very high ratio of length to cross-sectional diameter. Korean Patent Publication No. 2005-0099903 discloses a thread-type flexible battery comprising an inner electrode, electrolyte, and an outer electrode, however has a limited structure of one anode and one cathode and consequently a low capacity balance. Korean Patent No. 0804411 discloses a linear battery comprising a plurality of anodes and a plurality of cathodes with separators interposed therebetween. Korean Patent Registration No. 0742739 discloses a thread-type flexible battery including cathode threads and anode threads, however this is not based on an outer/inner electrode structure.

DISCLOSURE

Technical Problem

It is an object of the present invention to provide a secondary battery of a new linear structure that is easily adaptable in shape and has excellent stability and performance.

Technical Solution

A cable-type secondary battery of the present invention comprises an inner electrode comprising at least two anodes arranged in parallel, the anode extending longitudinally and having a horizontal cross section of a predetermined shape, the anode having an electrolyte layer thereon serving as an ion channel, an outer electrode comprising a cathode including a cathode active material layer surrounding the inner electrode, and a protection coating surrounding the outer electrode.

Alternatively, the cable-type secondary battery comprises an inner electrode comprising at least two cathodes arranged in parallel, the cathode extending longitudinally and having a horizontal cross section of a predetermined shape, the cathode having an electrolyte layer thereon serving as an ion channel, an outer electrode comprising an anode including an anode active material layer surrounding the inner electrode, and a protection coating surrounding the outer electrode.

The anode or the cathode has a cross section of a circular or polygonal shape, wherein the circular shape may be a circular shape of geometrical symmetry or an oval shape of geometrical asymmetry, and the polygonal shape may be a triangular, square, pentagonal, or hexagonal shape.

Preferably, the anode or the cathode includes a current collector and an active material layer formed on the outer surface of the current collector.

In this instance, the current collector may be preferably made from stainless steel, aluminum, nickel, titanium, sintered carbon, and copper; stainless steel surface-treated with carbon, nickel, titanium, and silver; aluminum-cadmium alloys; non-conductive polymer surface-treated with a conductive material; or conductive polymers. The conductive material may include polyacetylene, polyaniline, polypyrrole, polythiophene, polysulfur nitride, indium thin oxide (ITO), silver, palladium, nickel, and copper. Also, the conductive polymer may include polyacetylene, polyaniline, polypyrrole, polythiophene, and polysulfur nitride.

The anode active material may include carbonaceous materials; lithium-containing titanium composite oxides (LTOs); metals (Me) such as Si, Sn, Li, Zn, Mg, Cd, Ce, Ni, and Fe; alloys of the metals (Me); oxides (MeOx) of the metals (Me); and composites of the metals (Me) and carbon. The cathode active material may include $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

The electrolyte layer may be formed from an electrolyte selected from the group consisting of a gel polymer electrolyte of PEO, PVdF, PMMA, PAN, or PVAc; and a solid electrolyte of PEO, polypropylene oxide (PPO), polyethylene imine (PEI), polyethylene sulphide (PBS), or PVAc.

In the cable-type secondary battery of the present invention, the electrolyte layer may further include a lithium salt. The lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, LiAlCl$_4$, CH$_3$SO$_3$Li, CF$_3$SO$_3$Li, (CF$_3$SO$_2$)$_2$NLi, chlorine borane lithium, aliphatic lower lithium carbonate, and tetraphenyl lithium borate.

Advantageous Effects

A cable-type secondary battery of the present invention, in which a plurality of electrodes are included in another electrode, has free shape adaptation due to its linearity and flexibility, and thus is applicable to various types of portable devices. Also, the battery has a plurality of inner electrodes and a tubular outer electrode, which leads to an increased contact area therebetween and consequently a high battery rate, and by adjusting the number of inner electrodes, it is easier to control the capacity balance therebetween. A short circuit caused by repeated use may be prevented by the presence of a plurality of inner electrodes. Also, the battery has an electrolyte layer formed on the inner electrode to prevent direct contact between the inner electrode and the outer electrode, thereby preventing a short circuit. The relatively increased surface area of the inner electrode may achieve a high rate.

DESCRIPTION OF DRAWINGS

Other objects and aspects of the present invention will become apparent from the following description of embodiments with reference to the accompanying drawing in which.

BEST MODE

Hereinafter, the present invention will be described in detail with reference to the accompanying drawings. The description proposed herein is just a preferable example for the purpose of illustrations only, not intended to limit the scope of the invention, so it should be understood that other equivalents and modifications could be made thereto without departing from the spirit and scope of the invention.

Figure 1:
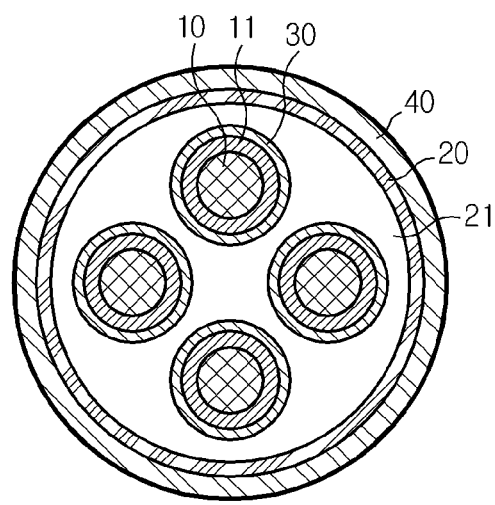
FIG. 1 is a cross-sectional view of a circular cable-type secondary battery.
Figure 2:
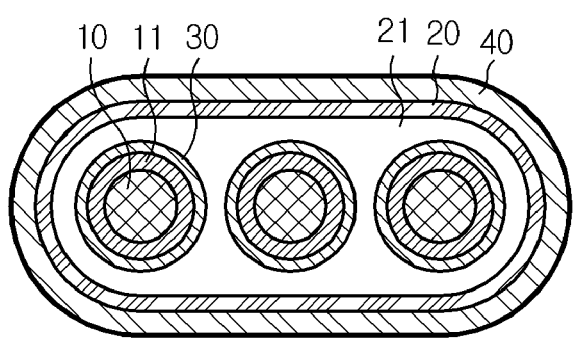
FIG. 2 is a cross-sectional view of an oval cable-type secondary battery.

FIGS. 1 and 2 illustrate examples of cable-type secondary batteries according to the present invention, wherein like elements are referred to like reference numerals. Referring to FIGS. 1 and 2, a cable-type secondary battery of the present invention comprises an inner electrode, an electrolyte layer 30, an outer electrode, and a protection coating 40. The inner electrode comprises at least two anodes arranged in parallel that have a horizontal cross section of a predetermined shape and extend longitudinally. The electrolyte layer 30 is formed on the inner electrode and serves as an ion channel. The outer electrode comprises a cathode including a cathode active material layer 21 surrounding the inner electrode. The protection coating 40 surrounds the outer electrode.

Alternatively, a cable-type secondary battery of the present invention comprises an inner electrode, an electrolyte layer 30, an outer electrode, and a protection coating 40. The inner electrode comprises at least two cathodes arranged in parallel that have a horizontal cross section of a predetermined shape and extend longitudinally. The electrolyte layer 30 is formed on the inner electrode and serves as an ion channel. The outer electrode comprises an anode including an anode active material layer 21 surrounding the inner electrode. The protection coating 40 surrounds the outer electrode. Here, the predetermined shape is not limited to a specific shape, and may include any shape without departing from the spirit and scope of the present invention.

The cable-type secondary battery of the present invention has a horizontal cross section of a predetermined shape and a linear structure extending perpendicularly to the horizontal cross section. Also, the cable-type secondary battery has flexibility and consequently free shape adaptation. The cable-type secondary battery may have various shapes such as, for example, a circular shape of geometrical symmetry as shown in FIG. 1 or an oval shape of geometrical asymmetry as shown in FIG. 2.

The cable-type secondary battery of the present invention has an inner electrode comprising a plurality of anodes or cathodes and an outer electrode comprising a tubular cathode or anode. The anode or the cathode generally includes a current collector and an active material layer formed on the current collector. However, when an active material layer alone functions as a current collector, the current collector may not be necessary. The anode or the cathode may have a cross section of a circular or polygonal shape, wherein the circular shape may be a circular shape of geometrical symmetry or an oval shape of geometrical asymmetry, and the polygonal shape is not limited to a specific type of polygonal shape unless it is a two-dimensional sheet type. For example, the polygonal shape may be, but not limited to, a triangular, square, pentagonal, or hexagonal shape.

The inner electrode comprises at least two anodes or cathodes arranged in parallel, however the present invention is not limited in this regard. For example, a plurality of anodes or cathodes may be arranged to be straight or twisted. In FIG. 1, an inner electrode is shown comprising four anodes or cathodes, and in FIG. 2, an inner electrode is shown comprising three anodes or cathodes.

The cable-type secondary battery comprising a plurality of electrodes has a high battery rate and excellent cell performance as a consequence of an increased contact area with an opposite electrode. Also, the cable-type secondary battery may be subject to a short circuit caused by repeated use due to its flexibility, however the battery may operate even when a short circuit occurs in one electrode. To maintain the capacity balance of the battery, an inner electrode comprising anodes should use a larger amount of an anode active material than that of a cathode active material used in an inner electrode comprising cathodes, due to the fact that an anode active material has a higher capacity per volume than a cathode active material. In the present invention, the capacity balance between inner and outer electrodes may be controlled by adjusting the number of inner electrodes.

Preferably, the anode or the cathode of the present invention includes a current collector 10 or 20 and an active material layer 11 or 21 formed on the surface of the current collector 10 or 20 by coating. The active material allows ion migration through the current collector 10 or 20, and ion migration is carried out by intercalation/disintercalation of ions into/from the electrolyte layer.

Preferably, the current collector 10 or 20 may be made from stainless steel, aluminum, nickel, titanium, sintered carbon, and copper; stainless steel surface-treated with carbon, nickel, titanium, and silver; aluminum-cadmium alloys; non-conductive polymers surface-treated with a conductive material; or conductive polymers.

The current collector 10 or 20 gathers the electrons generated by an electrochemical reaction of the active material, or supplies the electrons required for an electrochemical reaction. Generally, the current collector 10 or 20 is made from metal such as copper or aluminum. However, when the current collector 10 or 20 is particularly a polymer conductor of a non-conductive polymer surface-treated with a conductive material or of a conductive polymer, flexibility is relatively higher than that of the case where the current collector 10 or 20 is made from metal such as copper or aluminum. As the cable-type secondary battery of the present invention may have a plurality of electrodes, a plurality of current collectors may be used. Accordingly, even a small change in flexibility of each current collector may affect flexibility of the entire battery. Also, replacing a metal current collector with a polymer current collector may achieve light weight of the battery.

The conductive material may include polyacetylene, polyaniline, polypyrrole, polythiophene, polysulfur nitride, indium thin oxide (ITO), silver, palladium, nickel, and copper. The conductive polymer may include polyacetylene, polyaniline, polypyrrole, polythiophene, and polysulfur nitride. However, the non-conductive polymer used in the current collector 10 or 20 is not limited to a specific type of non-conductive polymer.

The anode active material may include, but is not limited to, carbonaceous materials; lithium-containing titanium composite oxides (LTOs); metals (Me) such as Si, Sn, Li, Zn, Mg, Cd, Ce, Ni, and Fe; alloys of the metals (Me); oxides (MeOx) of the metals (Me); and composites of the metals (Me) and carbon.

The cathode active material may include, but is not limited to, $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

In the cable-type secondary battery of the present invention, the electrolyte layer 30 formed on the inner electrode (anode or cathode) may prevent a direct contact between the inner electrode and the outer electrode, thereby preventing a short circuit, and may relatively increase a surface area of the inner electrode, thereby achieving a high battery rate. The electrolyte layer 30 as an ion channel is formed from a gel polymer electrolyte of polyethylene oxide (PEO), polyvinylidene fluoride (PVdF), polymethylmethacrylate (PMMA), polyacrylonitrile (PAN), or polyvinylacetate (PVAc); or a solid electrolyte of PEO, polypropylene oxide (PPO), polyethylene imine (PEI), polyethylene sulphide (PES), or PVAc. Preferably, a matrix of the solid electrolyte is basically a polymer matrix or a ceramic-glass matrix. Even though a typical polymer electrolyte has sufficient ion conductivity, ions may move slowly, that is, a reaction rate may be low, and thus the gel polymer electrolyte having favorable ion movement is preferred over the solid electrolyte. Because the gel polymer electrolyte has poor mechanical properties, a porous support or a crosslinked polymer may be used to improve the mechanical properties of the gel polymer electrolyte. The electrolyte layer 30 of the present invention may act as a separator, thereby eliminating the use of a separator.

The electrolyte layer 30 of the present invention may further contain a lithium salt. The lithium salt may improve ion conductivity and reaction rate, and may include, but is not limited to, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, and tetraphenyl lithium borate.

The protection coating 40 of the present invention acts as an insulator, and is formed on the outer surface of the outer electrode to protect the electrode from moisture in the air or from external impact. The protection coating 40 may include typical polymer resins, for example, PVC, high-density polyethylene (HDPE), or epoxy resin.

Hereinafter, a method for manufacturing the cable-type secondary battery as described above is described below in brief.

The anode or the cathode has the active material layer 11 or 21 formed on the current collector 10 or 20 by coating. In this instance, a typical coating process may be used, specifically an electroplating process or an anodic oxidation process. It is preferred to extrusion-coat an electrode slurry including an active material on a current collector through an extruder.

After the formed anode or cathode is applied as an inner electrode, the electrolyte layer 30 is formed around the inner electrode having the electrolyte layer 30. The active material layer 21 of the outer electrode is formed around the perimeter of the inner electrode. Alternatively, the inner electrode may be inserted into the active material layer 21. After the inner electrode and the active material layer 21 of the outer electrode are formed, the current collector 20 of the outer electrode and the protection coating 40 are formed thereon. Alternatively, after the outer electrode and the protection coating 40 are formed, the inner electrode may be inserted into the active material layer 21 of the outer electrode, or after the current collector 20 of the outer electrode and the protection coating 40 are formed, the inner electrode may be inserted and the active material layer 21 of the outer electrode may be then formed.

What is claimed is:

1. A cable secondary battery comprising:
   an inner electrode comprising at least two anodes arranged in parallel and spaced from one another, each of the anodes including a current collector and an anode active material on an outer surface of the current collector and extending longitudinally and having a horizontal cross section of a predetermined shape, each of the anodes having a respective electrolyte layer thereon serving as an ion channel, each respective electrolyte layer surrounding a respective current collector;
   an outer electrode comprising a cathode including a cathode active material layer and a hollow current collector disposed about the cathode active material layer, the cathode active material layer surrounding the inner electrode, the cathode being arranged in parallel with the at least two anodes; and
   a protection coating surrounding the outer electrode.

2. A cable secondary battery comprising:
   an inner electrode comprising at least two cathodes arranged in parallel and spaced from one another, each of the cathodes including a current collector and a cathode active material on an outer surface of the current collector and extending longitudinally and having a horizontal cross section of a predetermined shape, each of the cathodes having an electrolyte layer thereon serving as an ion channel, each respective electrolyte layer surrounding a respective current collector;
   an outer electrode comprising an anode including an anode active material layer, the anode active material layer surrounding the inner electrode, the anode being arranged in parallel with the at least two cathodes; and
   a protection coating surrounding the outer electrode.

3. The cable secondary battery according to claim 1, wherein the horizontal cross section of each of the anodes is a circular or polygonal shape.

4. The cable-type secondary battery according to claim 1, wherein the cathode has a cross section of a circular or polygonal shape.

5. The cable secondary battery according to claim 1, wherein the current collectors of the anodes are made from stainless steel, aluminum, nickel, titanium, sintered carbon, and copper; stainless steel surface-treated with carbon, nickel, titanium, and silver; aluminum-cadmium alloys; non-conductive polymer surface-treated with a conductive material; or conductive polymers.

6. The cable secondary battery according to claim 5, wherein the conductive material is any one selected from the group consisting of polyacetylene, polyaniline, polypyrrole, polythiophene, polysulfur nitride, indium thin oxide (ITO), silver, palladium, nickel, copper, and mixtures thereof.

7. The cable secondary battery according to claim 5, wherein the conductive polymer is any one selected from the group consisting of polyacetylene, polyaniline, polypyrrole, polythiophene, polysulfur nitride, and mixtures thereof.

8. The cable secondary battery according to claim 1, wherein the anode active material layer is formed from an active material including an active material particle of any one selected from the group consisting of carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, and mixtures thereof.

9. The cable secondary battery according to claim 1, wherein the hollow current collector is made from stainless steel, aluminum, nickel, titanium, sintered carbon, and copper; stainless steel surface-treated with carbon, nickel, titanium, and silver; aluminum-cadmium alloys; non-conductive polymers surface-treated with a conductive material; or conductive polymers.

10. The cable secondary battery according to claim 9, wherein the conductive material is any one selected from the group consisting of polyacetylene, polyaniline, polypyrrole, polythiophene, polysulfur nitride, indium thin oxide (ITO), silver, palladium, nickel, copper, and mixtures thereof.

11. The cable secondary battery according to claim 9, wherein the conductive polymer is any one selected from the group consisting of polyacetylene, polyaniline, polypyrrole, polythiophene, polysulfur nitride, and mixtures thereof.

12. The cable secondary battery according to claim 1, wherein the cathode active material layer is formed from an active material including an active material particle of any one selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$, and mixtures, wherein M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$.

13. The cable secondary battery according to claim 1, wherein each respective electrolyte layer is formed a gel polymer electrolyte of PEO, PVdF, PMMA, PAN, or PVAc; or a solid electrolyte of PEO, polypropylene oxide (PPO), polyethylene imine (PEI), polyethylene sulphide (PES) or PVAc.

14. The cable secondary battery according to claim 1, wherein each respective electrolyte layer further comprises a lithium salt.

15. The cable secondary battery according to claim 14, wherein the lithium salt is any one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, tetra-phenyl lithium borate, and mixtures thereof.

16. The cable secondary battery according to claim 1, wherein the inner electrode is surrounded by the outer electrode.

17. The cable secondary battery according to claim 1, wherein the cathode active material layer is concentric with the hollow current collector.

18. The cable secondary battery according to claim 1, wherein the at least two anodes are not in contact with one another and separated by the cathode active material layer.

19. The cable secondary battery according to claim 1, wherein each of the at least two anodes is individually covered with a designated electrolyte layer circumferentially disposed thereabout.

* * * * *